Dec. 4, 1945. E. C. GUEDON 2,390,216
LIGHT SHUTTER
Filed April 27, 1944 3 Sheets-Sheet 1
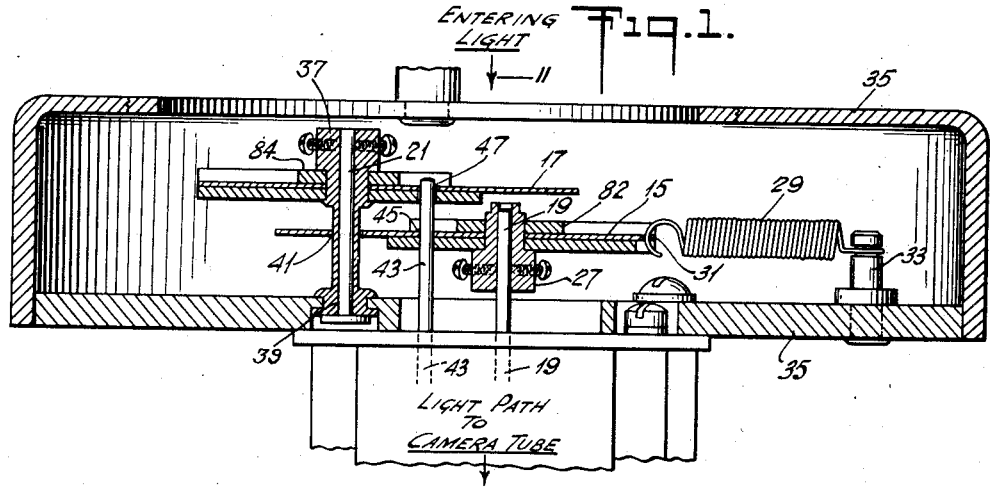
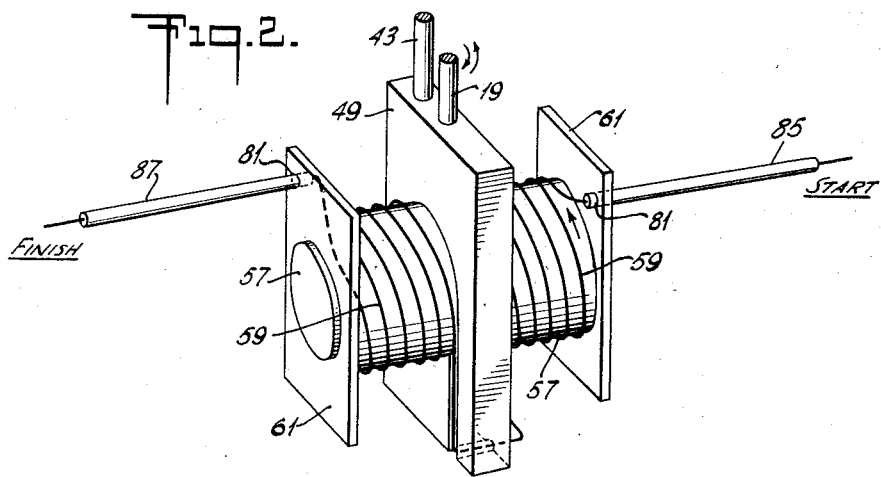
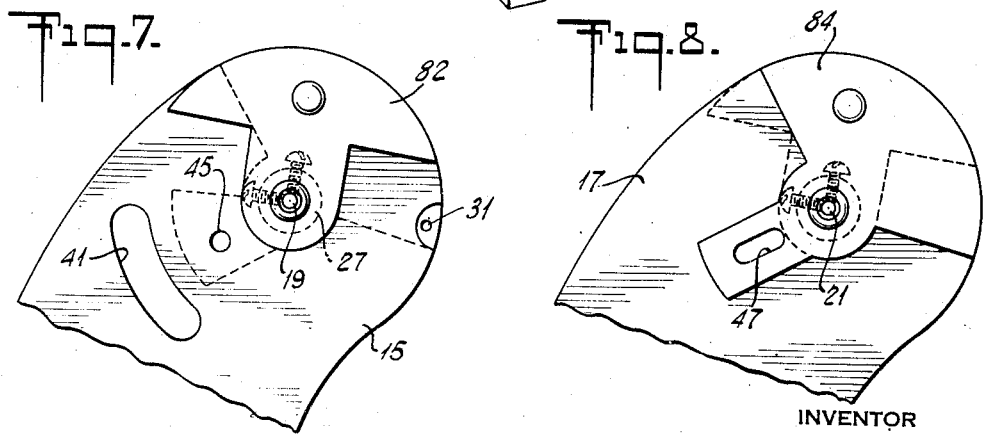
INVENTOR
EMILE C. GUEDON.
BY
ATTORNEY

INVENTOR
EMILE C. GUEDON.
BY
ATTORNEY

Dec. 4, 1945.  E. C. GUEDON  2,390,216
LIGHT SHUTTER
Filed April 27, 1944  3 Sheets-Sheet 3

INVENTOR
EMILE C. GUEDON.
BY
ATTORNEY

UNITED STATES PATENT OFFICE 2,390,216

LIGHT SHUTTER

Emile C. Guedon, Audubon, N. J., assignor to Radio Corporation of America, a corporation of Delaware Application April 27, 1944, Serial No. 532,985

4 Claims. (Cl. 95—62)

This invention relates to apparatus for controlling and regulating the amount of light which is permitted to enter an optical system to influence either a television camera tube or a light sensitive film or the like. In its particular form, the invention is so constituted as to provide an optical system through which the light may readily pass to a light sensitive element or to provide an arrangement for masking completely the entering light from the element.

Systems of this nature are particularly desirable especially in connection with television camera tube operations in order to protect the photosensitive mosaic of the camera tube (such as the well known "iconoscope" or "Orthicon") from the influence of high intensity light, for instance, during non scanning periods. The invention in its present form is so constituted that shutter or masking arrangements are provided as a part of the optical system. At time periods when scanning operations do not take place the shutter arrangement is normally closed, while at time periods during scanning operations the shutter is normally completely open. The control of the shutter preferably is under the influence of the control of the camera tube itself in that provision is made for opening the shutter upon applying operating voltages to the camera tube and its control system. At time periods when the camera tube ceases to operate by virtue of a removal of the power supply voltages therefrom, provision is made for automatically closing the shutter arrangements and thus precluding all possibility of light from external sources reaching the camera tube, it being understood, of course, that television camera tubes of the type herein to be described are of relatively high sensitivity and if subjected continually to intense light, a tendency would exist to ruining or damaging the photosensitive coating of the mosaic target electrode upon which the light image is projected for scanning.

It accordingly becomes an object of this invention to provide a system and means serving to control the light entering into and passing through an optical system from which it is arranged to effect light sensitive apparatus of either the photo-electric or the light sensitive emulsion variety.

Another object of the invention is to provide a shutter mechanism serving to protect a light translating element, with the shutter mechanism being so arranged as to close completely in the absence of operation of the light translating element.

Other objects of the invention and further advantages thereof will become apparent when the following specification is considered together with the drawings forming a part thereof.

By the drawings:

Fig. 1 is a view substantially in section taken along the line 1—1 of Fig. 5 and shows the general arrangement for driving the controlled shutter mechanism;

Fig. 2 is a view substantially in perspective of the rotor element for controlling the shutter motion;

Fig. 7 is a plan view of a portion of one of the shutter elements; and,

Fig. 8 is a plan view of a portion of the other of the shutter elements, with the view reversed in position from that shown in Figs. 5 and 6.

Figure 5:
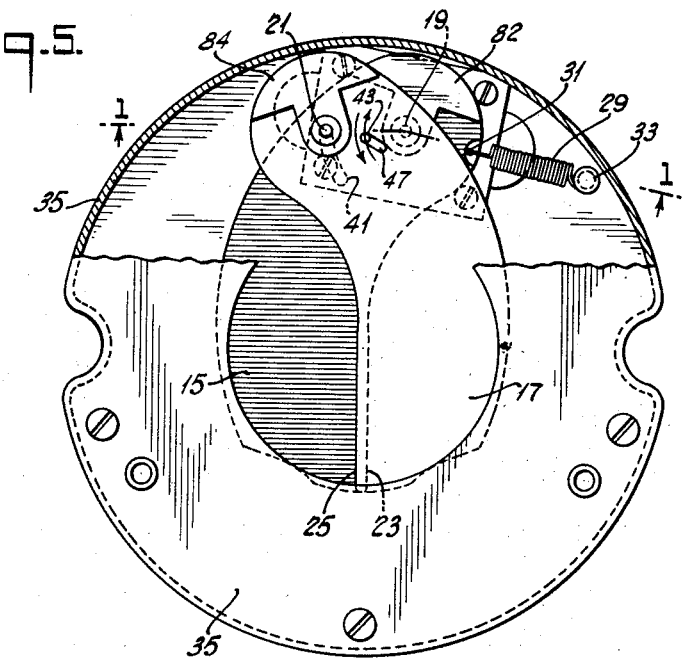
Fig. 5 is a plan view of the shutter arrangement with the outer housing member partly broken away to show the position of the shutter blades when closed.
Figure 6:
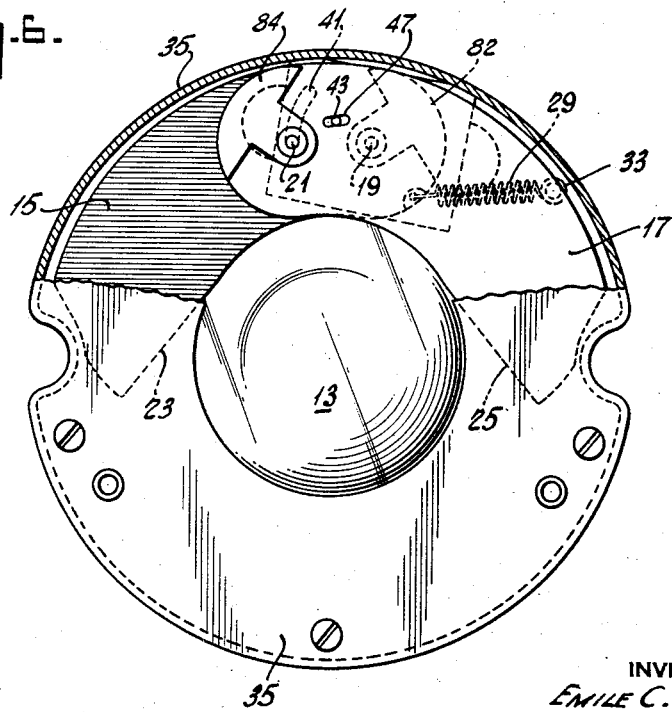
Fig. 6 is a view similar to Fig. 5 with the shutter blades open.

Referring now to the drawings and first to Fig. 1 thereof, the shutter assembly arrangement is arranged to be positioned in such a way as to provide shutter control arrangements for the optical system (not shown) directing light toward a television camera tube. In the arrangement of Fig. 1, the light which is to reach the television camera tube (not shown) is assumed to be directed along a path 11 through an optical system such as a lens element 13 (see Fig. 6) to influence the light sensitive mosaic electrode of a camera tube of the general type known as the "iconoscope," or "Orthicon," for instance, two shutter blades 15 and 17 in the path of the light passing along the light path 11. These blades are arranged respectively to pivot about pivot points 19 and 21 so that for opening of the shutter and to reveal the lens element 13 the shutter blade 15 rotates in a clockwise direction whereas the shutter blade 17 rotates in a counter-clockwise direction. The blades 15 and 17 have substantially flat or straight terminating edges 23 and 25 respectively, which overlap each other (as shown in Fig. 5) when the shutter blades are closed, but which when the shutter blades are open, reveal substantially the complete lens area 13.

In the arrangement shown the shutter blade 15 is supported upon a shaft or driving spindle 19 and keyed thereto in any appropriate manner as by the collar and set screw combination 27. The blade is normally held in a closed position (as shown in Fig. 5) under the influence of a coil spring 29 which has its free end anchored or secured to the shutter 15 at the point 31 and its other end anchored to a stud 33 secured to a housing or supporting member conventionally represented at 35. The other shaft 21, serving to support the shutter 17 which is fastened thereto by means of the collar and bushing arrangement 37, is also supported by the collar and bushing arrangement 39 on the housing 35.

As is indicated more particularly by the showing of Fig. 7, the shutter element 15 is slotted with an arcuate slot 41 through which the support shaft 21 is adapted to pass in order that arcuate motion of the shutter 15 about the pivot point 19 may be provided relative to the shaft 21. Motion of the shutter 15 and turning thereof about the support spindle 19 may be effected by means of both a drive pin 43, for instance, which is adapted to pass through the opening 45 in the shutter and also by virtue of the keying to the shaft 19 so as to provide the aforesaid assumed clockwise rotation to provide shutter opening. The drive pin 43 protrudes through the opening 45 in the shutter blade 15 and fits within a slot element 47 of the shutter blade 17 so as to cause it to turn simultaneously with the turning of the shutter blade 15.

It is thus evident that a rotary motion or a turning motion of the pin 43 about a center corresponding to the spindle 19 will cause the shutter blade 15 to rotate in one direction, for instance, clockwise, but it will also cause the shutter blade 17 to rotate in the opposite direction in view of the fact that shutter blade 17 is being rotated about a shaft 21 to the left of the drive pin or spindle 43 in contrast to the shutter blade 15 whose support spindle is to the right of the driven shaft.

Considering further the arrangement of Fig. 1 and now referring also to Fig. 2, it will be seen that the driving and support spindle 19, which forms a pivot about which the shutter blade 15 is turned, is secured in any desired manner to a central flange element 49 which is mounted or supported at its lowermost end in a bearing surface 51, with the surface area 53 forming an upper bearing surface and the area 55 a lower bearing surface. This complete flange element 49 is preferably formed of some desired form of insulating material, such as Bakelite, and serves to support a relatively soft steel core element 57 about which a coil 59 is appropriately wound. The ends of the coil are supported by outer flange elements 61 which also are formed of insulating material, such as Bakelite or the like. These elements 61 are arranged to have pole pieces 63 and 65 attached thereto so that the complete unit now provides a rotor element for a motor. Thus, when current is caused to flow through the windings 59, in the direction shown by the arrows, the pole pieces which are attached to the central steel core 57 by way of support screws 67, for instance, will form the north and south poles of a motor. The pole pieces 63 and 65 and the central core and flange assembly are then suitably held within a frame support element 69 with the lower bearing member held in the support 71 and the upper bearing member 53 held in the upper support 73. Lateral frame support members 75 are arranged to support additional pole pieces 77 and 79 which are magnetized when associated with the Alnico magnet element 77' arranged immediately beneath the support element 71.

The support element 71 is provided with two openings 78 through which the ends of the winding 59 are passed. These openings are provided with the wires relatively loose intermediate suitable binding posts 81 and the points 83 and 85 where they pass through and leave the support elements 61, so that the complete rotor section may be free to turn.

Thus, with the elements 63 and 65 constituting pole pieces attached at the end of the core member 57, it becomes apparent that at times when current is caused to flow through the windings 59, the pole pieces 63 and 65 attached at the ends of the coiled support flanges 61 will assume the state of north and south poles. Accordingly, at such time periods the attraction and repulsion effects exerted by the pole pieces 77 and 79 will be such as to cause the pole pieces 63 and 65 to move toward one of the pole pieces 77 and 79, and to move away from the other of the pole pieces. In this way the support spindle 19 turns either clockwise or counter-clockwise against the force normally exerted upon it by the spring member 29 which is attached to the shutter blade 15, which latter element is, in turn, fastened to the shaft or spindle 19 by means of the set screw and collar 27. Thus, the drive spindle 43, which is attached to the central flange member 49, also will rotate about the shaft or spindle 19 as a center.

For purposes of illustration it may be assumed that the complete assembly of the steel core 57 and its windings and associated pole pieces is such that it turns in a clockwise direction in the bearings 53 and 55 to rotate the shaft or spindle 19 clockwise, and with it the drive pin 43, whenever current is passed through the winding 59. Accordingly, the shutter blades will, under such circumstances, be opened by reason of the turning of the spindle 19, which itself causes the shutter blade 15 to rotate clockwise because of the attachment collar and set screw 27, in addition to the effect produced upon the opening of the blade due to the drive pin 43 which passes through the blade and fits tightly therein. The drive pin 43 then tends to rotate the shutter blade 17 counter-clockwise about the support shaft 21 because, as shown, blade 17 turns about an axis to the left of pin 43. The rotation of shaft 19 and drive pin 43 takes place as soon as current passes through the winding 59 to magnetize the iron core 57. If current is removed from the winding, then the magnets or pole pieces no longer remain sufficiently magnetized to assume the original position relative to the pole pieces 77 and 79, so that now the spring member 29 tends to act upon the shutter blade 15 and rotate it counter-clockwise about the center 19 and, at the same time, the drive pin 43 will be moved counter-clockwise and promptly cause the shutter element 17 to move clockwise to close. It thus becomes evident that the slot 41 cut in the shutter blade 15 is of a length such that the blade 15 may rotate without interference from the shaft or spindle 21 between a closed position and an open position.

So that the complete assembly may be carefully balanced, suitable counterweights 82 and 84 are attached respectively to the shutter blades 15 and 17. The counterweight is for the purpose of balancing the weight of the remaining portion of the shutter blade so that the device functions capably in all positions.

Figure 3:
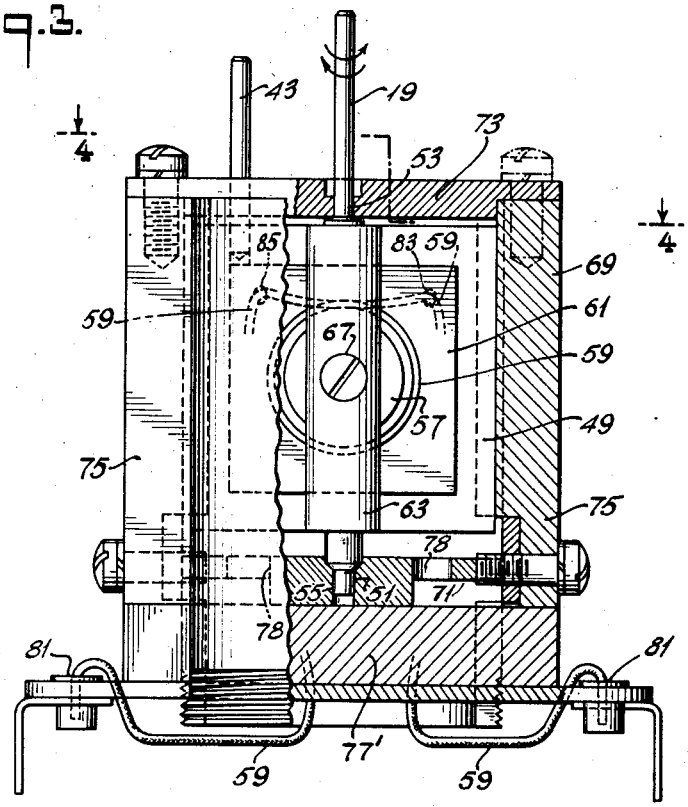
Figure 3 is an elevation view, partly in section, to show the positioning of the rotor element in the support frame.
Figure 4:
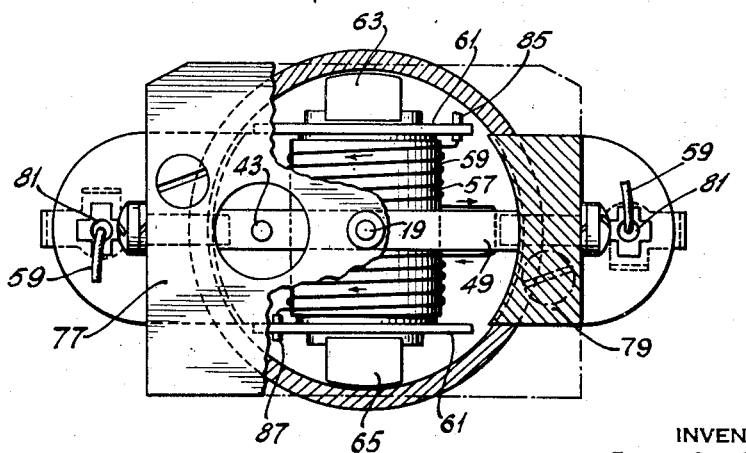
Fig. 4 is a plan view, partly in section, taken substantially along the line 4—4 of Fig. 3.

The limit of motion of the blades 15 and 17 in opening may readily be determined both by the housing 35 and by the resilient member or spring 29. Thus, spring 29 may be so made that maximum current through coils 59 will be able to produce only the shutter opening shown by Fig. 6, for instance, or the maximum opening may be reached when the blades strike the housing member 35. The closed shutter position will be reached when no current flows in the winding 59, for instance, and the pole pieces 63 and 65 are alined transverse to the pole pieces 77 and 79, as shown by Fig. 4, and the shutter blades occupy the position represented in Fig. 5.

While it has not been shown, it will be understood that the winding 59 is connected, where desired, serially with the source of operating voltage for the camera tube, so that at time periods when the camera tube is not in operation the shutter may remain closed due to de-energization of the magnetic field produced about the core 57. In the alternative, separate arrangements for opening and closing the circuit of the winding 59 under the independent control of the camera operator, may be provided. Such controls may be by way of a push button or toggle or the like adjacent either the camera tube itself or the camera tube monitor. Such arrangements thus serve the purpose of providing ready arrangements by which the camera tube may be protected in its operation.

Various modifications may readily be made without departing from either the spirit or scope of what has herein been shown, and it is believed that such modifications fall fairly within the spirit and scope of this disclosure.

Having described the invention, what I claim as new and desire to have protected by Letters Patent is:

1. An optical shutter system for television cameras and the like comprising a pair of movable shutter blades, separate spaced support spindles for supporting each shutter blade to which support spindles the said blades are secured so as to be adapted to turn about the support spindles relative to each other, a motor device having a rotor element which is provided with a winding thereabout and which is also supported upon a rotor shaft which also forms one of the said two blade support spindles so as to turn one of the shutter blades upon energization of the rotor element windings, a flange element also secured to the rotor element and carrying a pin member extending parallel to the said rotor shaft spindle and spaced apart therefrom and adapted to turn about the said spindle as an axis when the winding of the rotor element is energized, the second of said pair of shutter blades having a slotted area through which the said pin member protrudes, means for rotating the second of said shutter blades by said pin member about the second spindle with a rotation of the first named spindle and pin due to energization of the said rotor element coil, and resilient means for returning the shutter blades to a predetermined position at periods of de-energization of the motor coil.

2. An optical shutter system for television cameras and the like comprising a pair of spaced support spindles, a shutter blade element secured to each spindle and adapted to turn about the associated support spindle as an axis and also to turn relative to each other so as to be separated and overlapping in two extreme positions, a motor element having its rotor element provided with a winding through which electrical currents are adapted to flow and having the said rotor supported on a shaft which coincides with one of the two support spindles so as to rotate one of the shutter blades upon energization of the motor windings, a flange element secured to the rotor element, a pin member supported upon said flange and extending parallel to the said rotor shaft and spaced apart therefrom, said pin being positioned intermediate the said two spindles and being adapted to turn about the said first spindle as an axis when the motor winding is energized and the rotor element is turned, said shutter blade which is attached to the spindle forming the rotor shaft having a slotted area through which the other of said spindle members protrudes, sliding connection means between the pin element and the shutter blade carried upon the spindle which is spaced from the rotor shaft for turning the said shutter blade about its support spindle in a counter direction relative to the turning of the shutter blade secured to the spindle coinciding with the rotor shaft, and resilient means for returning the shutter blades to a predetermined position at periods of de-energization of the coil.

3. An optical shutter system for television cameras and the like comprising a pair of spaced support spindles, a shutter blade element secured to each spindle and adapted to turn about the associated support spindle as an axis and also to turn relative to each other so as to be separated and overlapping in two extreme positions, a motor element having a rotor element which is provided with a winding and which rotor element is also carried upon a shaft which coincides with one of the two support spindles so that the shutter blade which is attached thereto will rotate thereabout upon energization of the motor winding, a flange element secured to the rotor element and carrying a pin member extending parallel to the first said spindle and spaced apart therefrom and adapted to turn about the said motor shaft spindle as an axis when the motor winding is energized and the rotor element is turned, said shutter blade which is attached to the spindle forming the rotor shaft having a slotted area through which the other of said blade support spindles protrudes, sliding connection means provided by said pin member for turning the shutter blade secured to the spindle remote from the motor shaft spindle in a counter direction relative to the rotor shaft-connected shutter blade upon periods of energization of the said rotor winding, and resilient means for returning the shutter blades to a predetermined position at periods of de-energization of the coil.

4. The optical shutter system claimed in claim 3 comprising, in addition, a counter weight element secured to each shutter blade and supported thereby to balance the said blade in all positions of rotation.

EMILE C. GUEDON.